Patented Dec. 14, 1948

2,456,382

UNITED STATES PATENT OFFICE 2,456,382

COPOLYMER OF CYCLOHEXYL ALPHA CHLOROACRYLATE AND BUTADIENE-1,3

Albert M. Clifford, Stow, Ohio, assignor to Wingfoot Corporation, Akron, Ohio, a corporation of Delaware No Drawing. Original application November 29, 1940, Serial No. 367,771. Divided and this application January 13, 1943, Serial No. 472,257

1 Claim. (Cl. 260—84.5)

This invention relates to polymerized masses. More particularly, it relates to copolymers containing as one constituent thereof cyclohexyl alpha chloroacrylate. This application is a division of our application Serial No. 367,771, filed November 29, 1940.

The present invention is founded on the discovery that cyclohexyl alpha chloroacrylate may be interpolymerized with one or more monomeric materials to yield masses suitable for use as synthetic rubbers and the like.

Cyclohexyl alpha chloroacrylate may be copolymerized with one or more other monomeric substances, preferably a compound containing a vinyl radical (by which it is intended to include the vinylidene radical), such as butadiene; isoprene; 2,3-dimethyl butadiene-1,3; chloroprene; cyanoprene (2-cyano-1,3-butadiene); styrene and its homologues; acrylonitrile; vinylidene chloride; and the alpha alkyl-substituted acrylonitriles, such as methacrylonitrile.

The polymerization may be accomplished by any of the methods customarily used in the preparation of copolymers of this type, such as by heating the materials under anhydrous conditions with or without a solvent, or in aqueous emulsions in the presence of polymerization catalysts, promoters, and modifying agents. In emulsion polymerization, the emulsifying agents employed are illustrated by sodium oleate, the higher sodium alkyl sulfates, sodium alkylated naphthalene sulfonates, etc. The monomers may be present in various proportions, say from 10 per cent up to 90 per cent of the one and the inverse proportion of the other, although even less than 10 per cent of one constituent may be present. Prefererably, at least 25 per cent of each monomer is present. The temperature employed may range from room temperature to as high as 80° C. but will be chosen according to the result desired. An oxidant, such as sodium perborate, benzoyl peroxide, hydrogen peroxide and the like is employed in the emulsion polymerization, and a catalyst, such as carbon tetra chloride, ethylene dichloride or the like, may also be used. The polymerization is conducted for such period of time, usually several hours, but often over a day is required, as will give a latex of the required characteristics. In this connection, it has been observed that the esters of alpha halo acrylic acids notably increase the rate of reaction in copolymerizations involving their presence, either as one of the main ingredients of the copolymer or when added in small amounts to mixtures of monomers.

The preparation of the copolymers will be illustrated by referring to the reaction of a mixture of butadiene and cyclohexyl alpha chloroacrylate. The acrylate and butadiene may be present, for example, in the ratio of 60:40 parts by weight. The copolymerization may be carried out in an emulsion having the following composition:

5% Aquarex D solution the one-half sodium sulfate ester of a mixture of higher fatty alcohols consisting chiefly of the lauryl and myristyl derivatives _____ cc__ 10
Buffer solution _____ cc__ 10
$NaBO_3$ _____ g__ 0.133
$CCl_4$ _____ g__ 0.48
Monomers _____ g__ 16.0

A citric acid-phosphate or an acetate-phosphate buffer may be used. For example, the polymerization may be conducted in a sealed glass vessel at a temperature of 38° C., maintaining the pH at 7.4. By allowing such a reaction to continue for ninety-six hours, an 86.7 per cent yield of the copolymer was obtained.

The conditions for the formation of the copolymers are not critical but may be varied with respect to the constituents of the emulsion, the temperature, and the time, as may be found desirable. The polymerization may also be brought about in a solvent, by means of ultraviolet light and by other known methods of conducting polymerizations of this type. However, emulsion polymerization is preferred.

What I claim is:

A copolymer of cyclohexyl alpha chloroacrylate and butadiene-1,3.

ALBERT M. CLIFFORD.

REFERENCES CITED

The following references are of record in the file of this patent:

UNITED STATES PATENTS

| Number | Name | Date |
|---|---|---|
| 2,129,666 | Barrett et al. | Sept. 13, 1938 |
| 2,189,733 | Kistler | Feb. 6, 1940 |
| 2,234,204 | Starkweather | Mar. 11, 1941 |
| 2,247,790 | Strain et al. | July 1, 1941 |
| 2,286,264 | Crawford | June 16, 1942 |
| 2,385,182 | Anderson et al. | Sept. 18, 1945 |

FOREIGN PATENTS

| Number | Country | Date |
|---|---|---|
| 411,860 | Great Britain | June 13, 1934 |
| 514,912 | Great Britain | Nov. 21, 1939 |